(12) United States Patent
Park

(10) Patent No.: US 12,223,288 B2
(45) Date of Patent: Feb. 11, 2025

(54) NEURAL NETWORK PROCESSING UNIT INCLUDING APPROXIMATE MULTIPLIER AND SYSTEM ON CHIP INCLUDING THE SAME

(71) Applicant: Samsung Electronics Co., Ltd., Suwon-si (KR)

(72) Inventor: Jun-seok Park, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1118 days.

(21) Appl. No.: 16/239,046

(22) Filed: Jan. 3, 2019

(65) Prior Publication Data

US 2019/0212981 A1 Jul. 11, 2019

(30) Foreign Application Priority Data

Jan. 9, 2018 (KR) .................. 10-2018-0002776

(51) Int. Cl.
*G06F 7/487* (2006.01)
*G06F 7/499* (2006.01)
(Continued)

(52) U.S. Cl.
CPC ........ *G06F 7/4876* (2013.01); *G06F 7/49947* (2013.01); *G06F 7/5443* (2013.01); *G06N 3/04* (2013.01); *G06N 3/063* (2013.01)

(58) Field of Classification Search
CPC .. G06F 7/4876; G06F 7/49947; G06F 7/5443; G06F 15/7807; G06N 3/04;
(Continued)

(56) References Cited

U.S. PATENT DOCUMENTS 7,415,311 B2   8/2008  Calise et al.
9,400,955 B2   7/2016  Garimella
(Continued)

FOREIGN PATENT DOCUMENTS

CN   106447036 A   2/2017
CN   107153522 A   9/2017
(Continued)

OTHER PUBLICATIONS

Esposito, Darjn, Antonio GM Strollo, and Massimo Alioto. "Low-power approximate MAC unit." 2017 13th Conference on Ph. D. Research in Microelectronics and Electronics (PRIME). IEEE, 2017. (Year: 2017).*

(Continued)

*Primary Examiner* — Vincent Gonzales
*Assistant Examiner* — Sidney Vincent Bostwick
(74) *Attorney, Agent, or Firm* — Harness, Dickey & Pierce, P.L.C.

(57) ABSTRACT

A neural network processing unit may be configured to perform an approximate multiplication operation and a system on chip may include the neural network processing unit. The neural network processing unit may include a plurality of neural processing units and may perform a computation based on one or more instances of input data and a plurality of weights. At least one neural processing unit is configured to receive a first value and a second value and perform an approximate multiplication operation based on the first value and the second value and is further configured to perform a stochastic rounding operation based on an output value of the approximate multiplication operation.

17 Claims, 10 Drawing Sheets

(51) Int. Cl.
*G06F 7/544* (2006.01)
*G06N 3/04* (2023.01)
*G06N 3/063* (2023.01)

(58) Field of Classification Search
CPC ...... G06N 3/063; G06N 3/0454; G06N 3/084; G06G 7/14; G06G 7/16; G06G 7/26
See application file for complete search history.

(56) References Cited

U.S. PATENT DOCUMENTS

| | | | |
|---|---|---|---|
| 10,049,322 | B2 | 8/2018 | Ross |
| 10,192,162 | B2 | 1/2019 | Thorson et al. |
| 11,861,500 | B2* | 1/2024 | Kraus ................. G06N 3/084 |
| 2009/0298025 | A1 | 12/2009 | Raber |
| 2013/0198488 | A1 | 8/2013 | Pechanek |
| 2016/0328645 | A1 | 11/2016 | Lin et al. |
| 2016/0358075 | A1 | 12/2016 | Zhang et al. |
| 2017/0011288 | A1 | 1/2017 | Brothers et al. |
| 2017/0102920 | A1 | 4/2017 | Henry et al. |
| 2017/0103300 | A1 | 4/2017 | Henry et al. |
| 2017/0220341 | A1 | 8/2017 | Bradbury et al. |
| 2018/0315399 | A1* | 11/2018 | Kaul ................. G06N 3/063 |
| 2019/0164046 | A1* | 5/2019 | Song ................. G06N 3/0635 |

FOREIGN PATENT DOCUMENTS

| | | |
|---|---|---|
| CN | 107454966 A | 12/2017 |
| CN | 107533667 A | 1/2018 |
| EP | 2905699 A2 | 8/2015 |
| TW | 200746768 A | 12/2007 |

OTHER PUBLICATIONS

Kim, Duckhwan. Neurocube: Energy-efficient programmable digital deep learning accelerator based on processor in memory platform. Diss. Georgia Institute of Technology, 2017. (Year: 2017).*

Shafique, Muhammad, et al. "Adaptive and energy-efficient architectures for machine learning: Challenges, opportunities, and research roadmap." 2017 IEEE Computer society annual symposium on VLSI (ISVLSI). IEEE, 2017. (Year: 2017).*

Tensorflow. (n.d.). Easy to use batch norm layer. • issue #1122 • Tensorflow/Tensorflow. GitHub. https://github.com/tensorflow/tensorflow/issues/1122 (Year: 2016).*

Suyog Gupta et al., "Deep Learning with Limited Numerical Precision", IBM Almaden Research Center, Feb. 9, 2015, pp. 2-10.

The next wave of deep learning architectures, <https://www.nextplatform.com/2016/09/07/next-wave-deep-learning-architectures/>, Sep. 7, 2016.

Soheil Hashemi, et al., "DRUM: A Dynamic Range Unbiased Multiplier for Approximate Applications," 2015.

https://en.wikipedia.org/wiki/Central_limit_theorem.

Official communication issued on Dec. 2, 2022 in Taiwanese Application No. 108100877.

Uros Lotric et al., "Applicability of approximate multipliers in hardware neural networks," Neurocomputing, Elsevier, vol. 96, pp. 57-65, May 11, 2012.

Office Action issued Sep. 22, 2022 in Korean Application No. 10-2018-0002776.

Office Action issued Dec. 20, 2023 in Chinese Application No. 201910018283.5.

* cited by examiner

NEURAL NETWORK PROCESSING UNIT INCLUDING APPROXIMATE MULTIPLIER AND SYSTEM ON CHIP INCLUDING THE SAME

CROSS-REFERENCE TO RELATED APPLICATION

This application claims the benefit, under 35 U.S.C. § 119, of Korean Patent Application No. 10-2018-0002776, filed on Jan. 9, 2018, in the Korean Intellectual Property Office, the disclosure of which is incorporated herein in its entirety by reference.

BACKGROUND

The inventive concepts relate to neural network processing units, and more particularly, to neural network processing units including an approximate multiplier and a system on chip including the same.

A neural network refers to a computational architecture that models a biological brain. Recently, with the development of neural network technology, various types of electronic systems have been actively studied for analyzing input data and extracting valid information using a neural network processing unit.

Neural network processing units utilize a relatively large amount of computations to process complex input data. For a neural network processing unit to be configured to analyze high-quality input in real time and extract information, technology for efficiently processing neural network operations is required. For example, low-power and high-performance embedded systems such as smart phones have limited resources.

SUMMARY

Some example embodiments provide neural network processing units that are configured to enable a reduction of loss of accuracy while reducing the amount of computations required to process complex input data, thereby providing neural network processing units that may be particularly suitable for inclusion in low-power and high-performance embedded systems, including smart phones.

The inventive concepts provide neural network processing units including an approximate multiplier configured to perform a fixed-point type training computation and a system on chip including the same.

According to an aspect of the inventive concepts, a neural network processing unit may be configured to perform a computation based on one or more instances of input data and a plurality of weights. The neural network processing unit may include a plurality of neural processing units. At least one neural processing unit of the plurality of neural processing units may be configured to receive a first value and a second value and perform an approximate multiplication operation based on the first value and the second value and perform a stochastic rounding operation based on an output value of the approximate multiplication operation.

According to another aspect of the inventive concepts, a system on chip may include one or more semiconductor intellectual property cores (IPs) and a neural network processing unit configured to receive input data from the one or more IPs and perform a neural network computation based on the input data and a plurality of weights. The neural network processing unit may include a plurality of neural processing units, wherein at least one neural processing unit of the plurality of neural processing units is configured to receive a first value and a second value and perform an approximate multiplication operation on the first value and the second value and perform a stochastic rounding operation based on an output value of the approximate multiplication operation to output a post activation regarding the output of the approximate multiplication operation.

According to another aspect of the inventive concepts, a neural network processing unit may be to perform a training operation based on one or more instances of training data and a plurality of weights in a training mode. The neural network processing unit may include a plurality of neural processing units. At least one neural processing unit of the plurality of neural processing units may be configured to receive a first value and a second value and perform an approximate multiplication operation on the first value and the second value in the training mode, perform an addition operation based on an output value of the approximate multiplication operation and a third value, accumulate an output value of the approximate multiplication operation, and perform a stochastic rounding operation on an accumulation value output based on the accumulating to output a post activation regarding the accumulation value.

BRIEF DESCRIPTION OF THE DRAWINGS

Example embodiments of the inventive concepts will be more clearly understood from the following detailed description taken in conjunction with the accompanying drawings in which:

FIG. 3 may be described with reference to FIG. 2;

DETAILED DESCRIPTION OF THE EMBODIMENTS

Hereinafter, example embodiments of the present inventive concepts will be described in detail with reference to the accompanying drawings.

Figure 1:
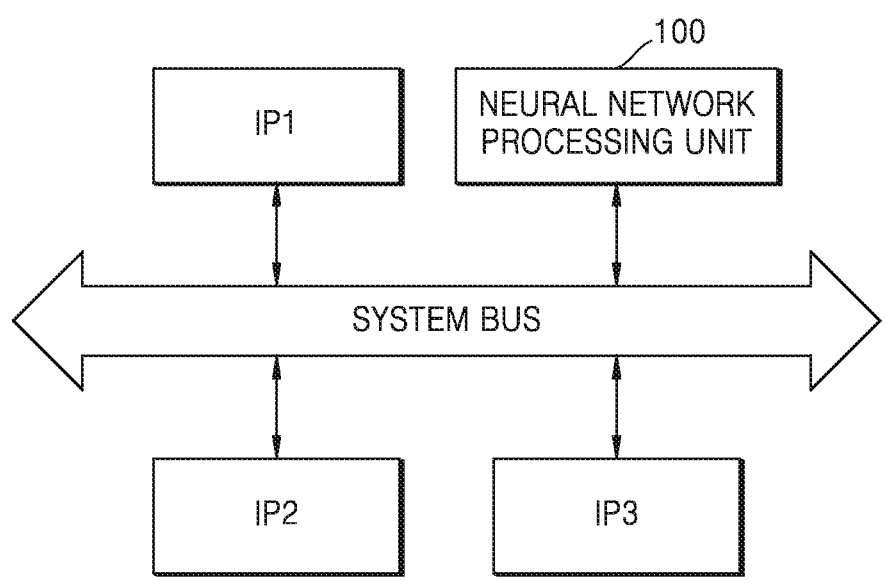
FIG. 1 is a block diagram illustrating a system on chip (SoC) according to some example embodiments of the present disclosure.

FIG. 1 is a block diagram illustrating a system on chip (SoC) 10 according to some example embodiments of the present disclosure.

Referring to FIG. 1, the SoC 10 may include a plurality of intellectual properties (IPs) and a neural network processing unit (NPU) 100. The SoC 10 may be designed to perform various functions in a semiconductor system, and for example, the SoC 10 may be an application processor. The SoC 10 may analyze input data in real time based on a neural network and extract valid information, and based on the extracted information, may determine situations or control configurations of an electronic device where the SoC 10 is mounted. For example, the SoC 10 may be used in a drone, a robot apparatus such as advanced driver assistance systems (ADAS), an autonomous vehicle, a smart television (TV), a smartphone, a medical device, a mobile device, an image display device, a measuring device, an Internet of Things (IoT) device, etc., and in addition, may be mounted on at least one of various kinds of electronic devices.

As used herein, it will be understood that an IP (e.g., IP1, IP2, and IP3) refers to an instance of hardware circuitry (e.g., integrated circuit) that is the intellectual property of one party. As referred to herein an IP may be referred to interchangeably as a semiconductor intellectual property core, IP core, and/or IP block. The SoC 10 may include various kinds of IPs. For example, the IPs may include a processing unit ("instance of processing circuitry," e.g., a CPU, Application Specific Integrated Circuit, some combination thereof, or the like), a plurality of cores included in the processing unit, Multi-Format Codec (MFC), a video module (e.g. a camera interface, a Joint Photographic Experts Group (JPEG) processor, a video processor, or a mixer), a three-dimensional (3D) graphic core, an audio system, a driver, a display driver, volatile memory, non-volatile memory, a memory controller, input and output interface blocks, or cache memory.

The majority of techniques for connecting IPs involve a connection method based on a system bus. For example, as standard bus specification, the Advanced Microcontroller Bus Architecture (AMBA) protocol of Advanced RISC Machines Ltd (ARM) may be used. Bus types of the AMBA protocol may include Advanced High-Performance Bus (AHB), Advanced Peripheral Bus (APB), Advanced eXtensible Interface (AXI), AXI4, AXI Coherency Extensions (ACE), etc. AXI from among the above-described bus types is an interface protocol between IPs and may provide a multiple outstanding address function, a data interleaving function, etc. In addition, other types of protocols such as uNetwork of SONICs Inc., CoreConnect of IBM, or Open Core Protocol of OCP-IP may be applied to the system bus.

The NPU 100 may generate the neural network, may train (or learn) the neural network, may perform a computation based on received input data and generate an information signal based on a result of the computation, or may retrain the neural network. In some example embodiments, the NPU 100 may train the neural network on a fixed point basis. This will be described below in detail.

It will be understood that the NPU 100 may be and/or may be implemented by a processor (e.g., instance of processing circuitry) that may execute a program of instructions stored in a memory (e.g., storage device). Accordingly, the NPU 100 as described herein may be, in some example embodiments, a processor implementing the functionality of the NPU 100.

The NPU 100 may receive various kinds of input data from the IPs via the system bus, and may generate an information signal (e.g., perform a neural network computation based on the input data to generate an output signal) accordingly. The information signal generated by the neural network may include one of various kinds of recognition signals such as a voice recognition signal, an object recognition signal, an image recognition signal, and a bio-information recognition signal. For example, the NPU 100 may receive frame data included in a video stream as input data, and may generate a recognition signal regarding an object included in an image represented by the frame data from the frame data. However, the present disclosure is not limited thereto, and the NPU 100 may receive various kinds of input data and may generate a recognition signal according to the input data.

Figure 2:
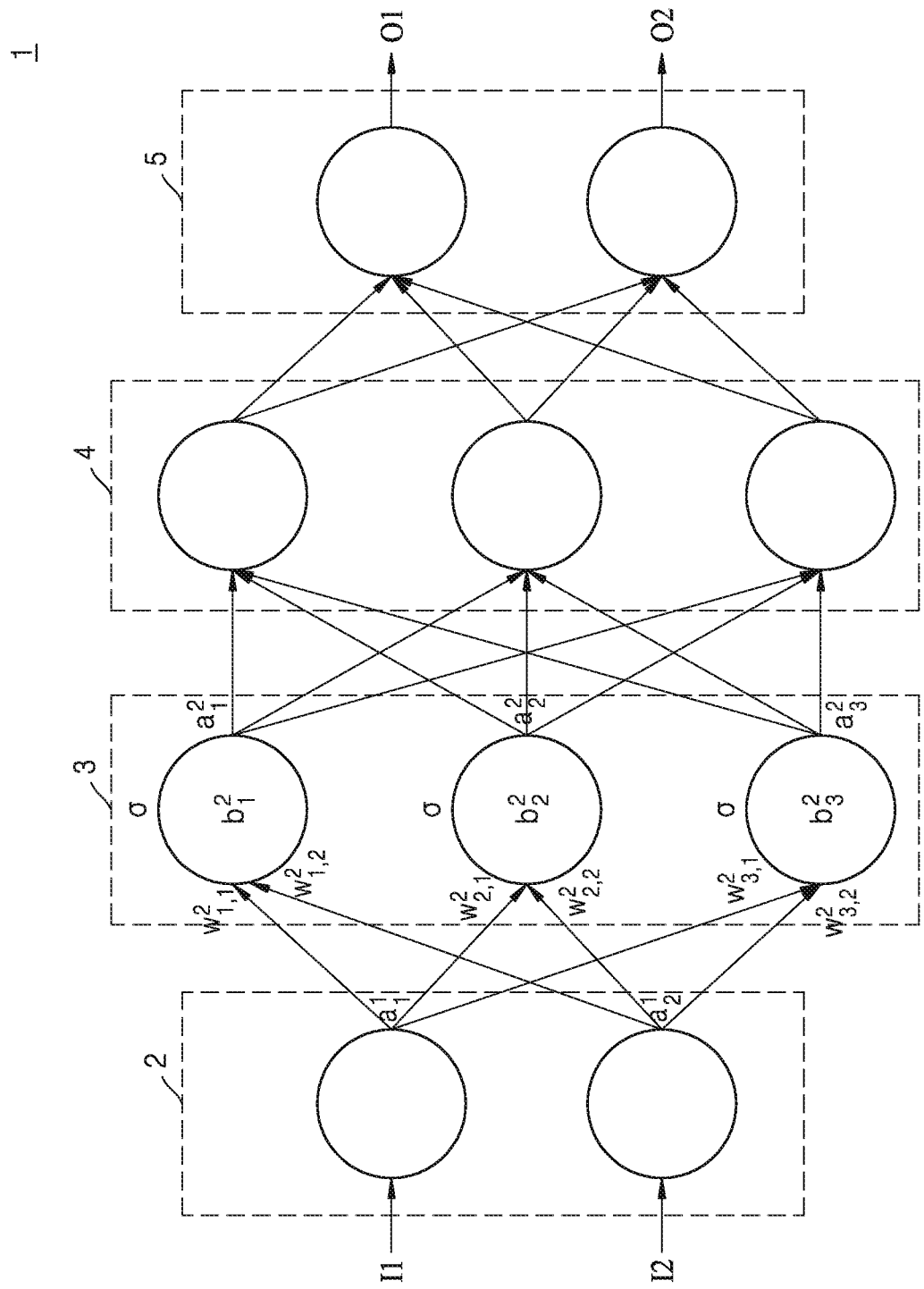
FIG. 2 is a diagram illustrating an example of a neural network according to some example embodiments of the present disclosure.

FIG. 2 is a diagram illustrating an example of a neural network 1 according to some example embodiments of the present disclosure. The neural network as shown in FIG. 2 may be implemented by a neural network processing unit, including for example the NPU 100 and/or the NPU 1058 shown in FIG. 13 (described further below).

Referring to FIG. 2, the neural network 1 may have a structure including an input layer, hidden layers, and an output layer. A neural network processing unit implementing the neural network 1 may perform a computation based on received input data (e.g., I1 and I2) and may generate output data (e.g., O1 and O2) based on a result of the computation. In some example embodiments, a neural network processing unit may be trained to implement the neural network 1 through the computation performed based on input data. Training a neural network processing unit to implement a neural network may be referred to herein as "training" the neural network. When the neural network 1 is trained, the input data may be training data.

The neural network 1 may be a deep neural network (DNN) or n-layers neural networks including two or more hidden layers. For example, as illustrated in FIG. 2, the neural network 1 may be a DNN including an input layer 2, first and second hidden layers 3 and 4, and an output layer 5. The DNN may include, but is not limited to, convolutional neural networks (CNN), recurrent neural networks (RNN), deep belief networks, restricted Boltzmann machines, etc.

When the neural network 1 has a DNN structure, the neural network 1 includes more layers from which valid information may be extracted, and thus, the neural network 1 may process complex data sets. Although the neural network 1 is illustrated as including four layers, i.e., the input layer 2, the first and second hidden layers 3 and 4, and the output layer 5, this is merely an example, and the neural network 1 may include fewer or more layers. In addition, the neural network 1 may include layers of various structures different from those illustrated in FIG. 2.

Each of the input layer 2, the first and second hidden layers 3 and 4, and the output layer 5 included in the neural network 1 may include a plurality of neurons. The neurons may correspond to a plurality of artificial nodes, known as processing elements (PEs), units, or similar terms. For example, as illustrated in FIG. 2, the input layer 2 may include two neurons (nodes), and each of the first and second hidden layers 3 and 4 may include three neurons (nodes). However, this is merely an example, and each of the layers included in the neural network 1 may include various numbers of neurons (nodes).

The neurons included in each of the layers included in the neural network 1 may be connected to each other to exchange data. One neuron may receive data from other neurons and perform a computation, and may output a result of the computation to other neurons.

An input and an output of each of the neurons (nodes) may be referred to as an input activation and an output activation. That is, an activation may be an output of one neuron and may also be a parameter corresponding to an input of neurons included in the next layer. Each of the neurons may determine their activation based on activations and weights received from neurons included in the previous layer. A weight is a parameter used to calculate an output activation in each neuron, and may be a value allocated to a connection relationship between neurons.

Each of the neurons may be processed by a neural processing unit (or a PE) that receives an input and outputs an activation, and input-output of each of the neurons may be mapped. For example, σ may be an activation function, and $w_{j,k}^i$ may be a weight value from a kth neuron included in an (i−1)th layer to a jth neuron included in an ith layer, $b_j^i$ may be a bias value of the jth neuron included in the ith layer, and $a_j^i$ may be an activation of the jth neuron of the $i^{th}$ layer, in other words, a post-activation. The post-activation $a_j^i$ may be calculated using the following Equation 1.

$$a_j^i = \sigma\left(\sum_k (w_{j,k}^i \times a_k^{i-1}) + b_j^i\right)$$ [Equation 1]

As illustrated in FIG. 2, a post-activation of a first neuron of the first hidden layer 3 may be denoted as $a_1^2$. In addition, $a_1^2$ may have a value of $a_1^2 = \sigma(w_{1,1}^2 \times a_1^1 + w_{1,2}^2 \times a_2^1 + b_1^2)$ according to Equation 1. In other words, a post-activation may be a value obtained by applying an activation function to a sum of activations received from the previous layer. However, Equation 1 is merely an example for explaining the activation and the weight used to process data in the neural network 1, and is not limited thereto.

As described above, in the neural network 1, numerous data sets are exchanged between a plurality of mutually connected neurons, and undergo numerous computation processes as they pass through layers. Through such computations, the neural network 1 may be trained, and weights and biases may be optimized accordingly. An NPU according to some example embodiments of the present disclosure may include and/or may be configured to implement an approximate multiplier, and may be configured to train the neural network 1 based on a fixed-point type activation, a weight, and a bias. Detailed description thereof will be given below.

Figure 3:
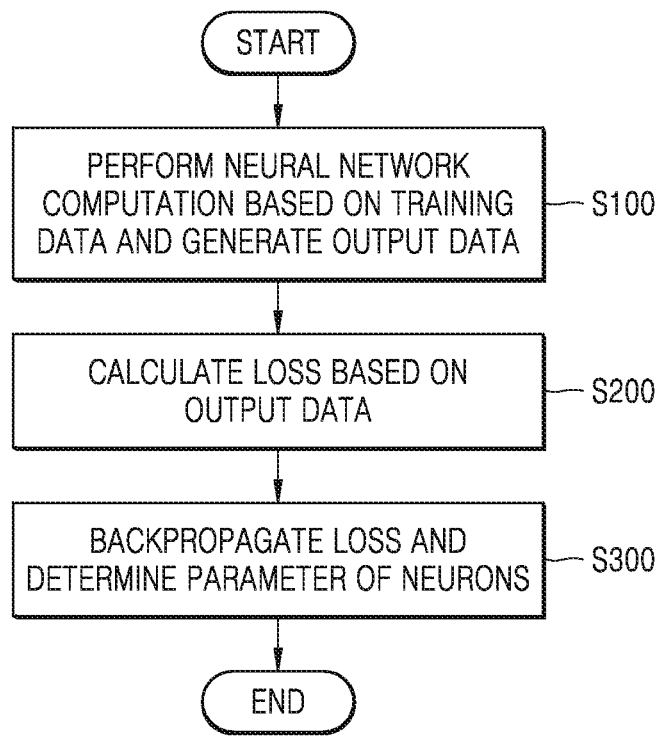
FIG. 3 is a flowchart illustrating a training process of a neural network according to some example embodiments of the present disclosure.

FIG. 3 is a flowchart illustrating a training process of a neural network according to some example embodiments of the present disclosure. FIG. 3 may be described with reference to FIG. 2. The training process shown in FIG. 3 may be implemented by a neural network processing unit, including the NPU 100 and/or the NPU 1058 shown in FIG. 13 (described further below).

Referring to FIG. 3, in operation S100, a computation of the neural network 1 may be performed based on training data, and output data may also be generated. In other words, when training data is applied to the input layer 2 as the input data I1 and I2, the neural network 1 may generate the output data O1 and O2 corresponding to the training data. The training data, which is input data applied to the neural network 1 for learning, may be data that knows beforehand a corresponding target value or label.

The neural network 1 may be trained based on a fixed-point type activation, a weight, and a bias. In some example embodiments, a post-activation in each neuron may be calculated based on a fixed-point approximate multiplier, a fixed-point adder, and a fixed-point rounder. For example, a post-activation and a weight of the previous layer may be approximately multiplied together through an approximate multiplier, and rounding may be performed on a value obtained by adding up a plurality of approximate multiplications. For example, a rounder may perform stochastic rounding.

In operation S200, a loss may be calculated based on the output data corresponding to the training data. For example, the loss may refer to a difference between a target value corresponding to the training data and the output data corresponding to the training data.

In operation S300, the loss may be back propagated to the neural network 1, and parameters of each neuron may be determined. The parameters of a neuron may include various kinds of data providing the basis of a neural network computation, for example, weights, biases, etc. As the neural network 1 is repeatedly trained, parameters of the neural network 1 may be tuned to compute a more accurate output with respect to a given input.

Figure 4:
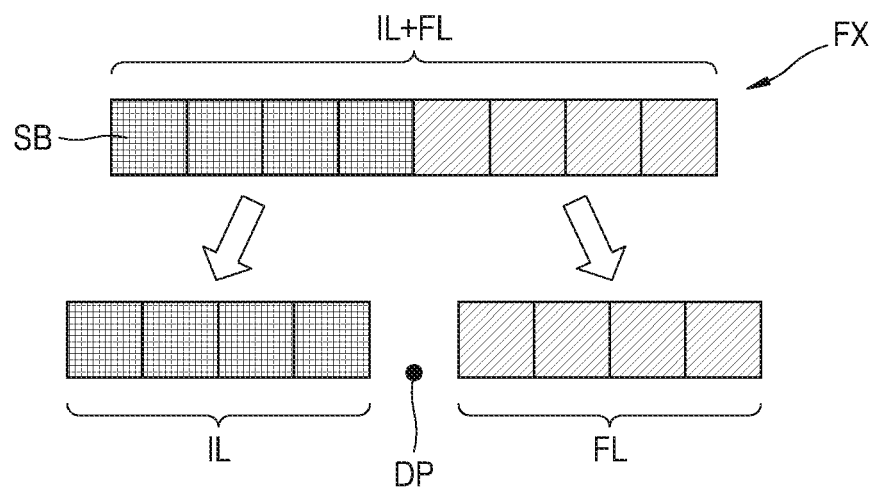
FIG. 4 is a diagram illustrating an example of a fixed point value.

FIG. 4 is a diagram illustrating an example of a fixed point value FX.

Referring to FIG. 4, the fixed point value FX may be divided into an integer part IL, a decimal point DP, and a fractional part FL. A fixed point refers to a representation in which a decimal that has a fixed number of digits is denoted by using a decimal point.

The integer part IL may include a sign bit SB. The sign bit SB may determine a sign of the fixed point value FX. The integer part IL may correspond to a part indicating an integer of the fixed point value FX, and the fractional part FL may correspond to a part indicating a fraction of the fixed point value FX. The decimal point DP may refer to a point of reference for making a distinction between the integer part IL and the fractional part FL of the fixed point value FX.

For example, when the fixed point value FX is an 8-bit fixed point value, each of the bits denoting the integer part IL and the fractional part FL may have a value of 1 or 0. The bits denoting the integer part IL may sequentially denote values of −8, +4, +2, and +1 from the sign bit SB. In addition, the bits denoting the fractional part FL may sequentially denote values of +0.5, +0.25, +0.125, and +0.0625 based on the decimal point DP. For example, when the sign bit SB is 1, a value that a most significant bit of the integer part IL denotes is −8, in which a value that the fixed point value FX denotes is a negative number regardless of values of the other bits included in the integer part IL and the fractional part FL.

Although FIG. 4 illustrates an 8-bit fixed point value FX, this is merely an example embodiment, and the fixed point value FX may be a fixed point value having any proper number of bits. In addition, the fixed point value FX may denote a negative number using one of a coded representation, a ones' complement system, and a two's complement system.

Figure 5:
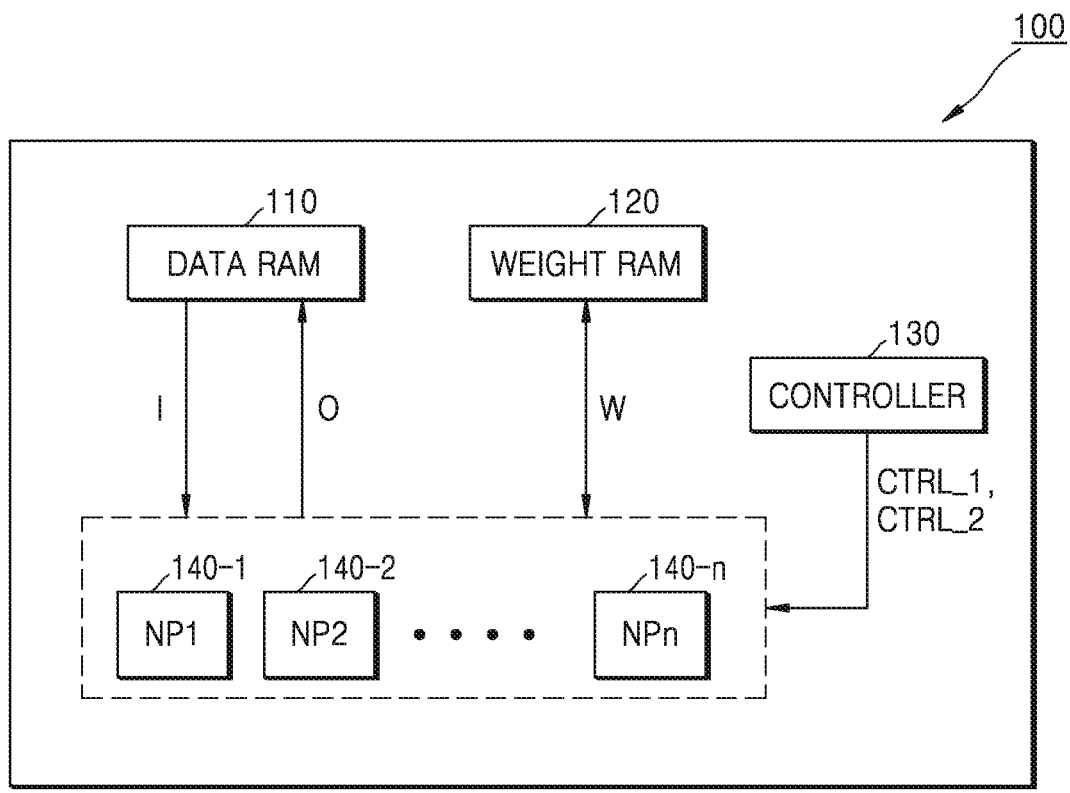
FIG. 5 is a block diagram illustrating an example of a structure of a neural network processing unit according to some example embodiments of the present disclosure.

FIG. 5 is a block diagram illustrating an example of a structure of the NPU 100 according to some example embodiments of the present disclosure. FIG. 5 illustrates, for example, a detailed structure of the NPU 100. Hereinafter, FIG. 5 will be described with reference to FIG. 1.

Referring to FIG. 5, the NPU 100 may include data random access memory (data RAM) 110, weight RAM 120, a controller 130, and a plurality of neural processing units 140-1 to 140-n. Although not illustrated, the NPU 100 may further include a sequencer, a plurality of registers, a program memory, etc. The controller 130, sequencer, plurality pf registers, program memory, etc., in some example embodiments, may be and/or may be implemented by a processor (e.g., instance of processing circuitry) executing a program of instructions stored in a memory (e.g., a storage device). Accordingly, the controller 130, sequencer, plurality pf registers, program memory, etc., as described herein may be, in some example embodiments, a processor implementing the functionality of the controller 130, sequencer, plurality pf registers, program memory, etc.

As described herein, the neural processing units 140-1 to 140-n may each be implemented by a processor (e.g., instance of processing circuitry) executing a program of instructions stored in a memory (e.g., a storage device). Accordingly, the controller 130, sequencer, plurality pf registers, program memory, etc., as described herein may be, in some example embodiments, a processor implementing the functionality of the controller 130, sequencer, plurality pf registers, program memory, etc.

In some example embodiments, each separate neural processing unit 140-1 to 140-n is a separate instance of circuitry configured to implement the functionality of the respective neural processing unit.

The data RAM 110 may store one or more pieces ("instances") of input data I and may apply the input data I to the neural processing units 140-1 to 140-n. For example, the input data I may be provided from at least one of a plurality of IPs. In addition, output data O generated based on a computation of the neural processing units 140-1 to 140-n may be received and stored. In some example embodiments, the input data I and the output data O may be of a fixed-point type.

For example, in a training mode (or a learning mode) of the NPU 100 (e.g., in response to the NPU 100 operating in a training mode), the data RAM 110 may store training data (e.g., training data received from one or more IPs in a training mode) and may apply the training data to the neural processing units 140-1 to 140-n as the input data I. For example, in an inference mode of the NPU 100 (e.g., in response to the NPU 100 operating in an inference mode), the data RAM 110 may store data for an inference operation of the NPU 100 and may apply the data to the neural processing units 140-1 to 140-n as the input data I. When the NPU 100 is included in a system on chip (e.g., 10 of FIG. 1), the data RAM 110 may store data output from various IPs included in the system on chip (e.g., 10 of FIG. 1) as the input data I. The NPU 100 may thus perform a training operation based on one or more pieces ("instances") of training data and a plurality of weights in a training mode. The training operation may include a fixed-point-type training operation.

The weight RAM 120 may store a plurality of weights W and may apply each weight to a corresponding neural processing unit. In other words, the weights W respectively allocated to the neural processing units 140-1 to 140-n may be stored in the weight RAM 120. For example, in a training mode (or a learning mode) of the NPU 100, the weight RAM 120 may receive the weights W tuned through training processes from the neural processing units 140-1 to 140-n and may store the weights W. In some example embodiments, the weight W may be of a fixed-point type.

The data RAM 110 and the weight RAM 120 may be, for example, dynamic RAM (DRAM), static RAM (SRAM), synchronous DRAM (SDRAM), phase-change RAM (PRAM), etc. However, the present disclosure is not limited thereto, and the data RAM 110 and the weight RAM 120 may be implemented as various kinds of memory.

The controller 130 may perform general control operations on the neural processing units 140-1 to 140-n. For example, the controller 130 may apply a first control signal CTRL_1 for controlling a multiplexer included in each neural processing unit to the neural processing units 140-1 to 140-n. In addition, in some example embodiments, the controller 130 may apply a second control signal CTRL_2 for controlling an approximate multiplier included in each neural processing unit to the neural processing units 140-1 to 140-n. For example, the second control signal CTRL_2 may be a basis for mode selection of the approximate multiplier. As described herein a control signal for controlling a mode of an element of a neural processing unit 140-1 to 140-n (e.g., a multiplexer and/or an approximate multiplier) may be a control signal that is output to control a mode of at least one neural processing unit 140-1 to 140-n.

The neural processing units 140-1 to 140-n may be configured to operate as neurons included in layers (e.g. 2, 3, 4, and 5 of FIG. 2) of a neural network (e.g. 10 of FIG. 2), respectively. For example, at least some of the neural processing units 140-1 to 140-n may operate corresponding to neurons included in an input layer (e.g. 2 of FIG. 2), and thus, may receive the input data I and the weight W and output an activation accordingly. For example, some others of the neural processing units 140-1 to 140-n may operate corresponding to neurons included in hidden layers (e.g. 3 and 4 of FIG. 2), and thus, may receive activations and the weight W received from neurons included in the previous layer and output an activation accordingly. For example, the others of the neural processing units 140-1 to 140-n may operate corresponding to neurons included in an output layer (e.g. 5 of FIG. 2), and thus, may receive activations and the weight W received from neurons included in the previous layer and generate output data accordingly.

In some example embodiments, at least one of the neural processing units 140-1 to 140-n may include an approximate multiplier and a rounder. Restated, at least one of the neural processing units may be configured to implement the functionality of an approximate multiplier and a rounder. For example, at least one of the neural processing units 140-1 to 140-n may perform an approximate multiplication operation based on a first value (e.g., mo) and a second value (e.g., W) received at the at least one neural processing unit, for example on an activation (e.g., I_A) and the weight W via the approximate multiplier. In addition, at least one of the neural processing units 140-1 to 140-n may perform stochastic rounding ("perform a stochastic rounding operation") based on an output of the approximate multiplication operation, for example on a sum of a plurality of approximately multiplied values via the rounder.

Although not illustrated in some example embodiments, the NPU 100 may further include a clock, and the neural processing units 140-1 to 140-n may perform a computation operation during each clock cycle. In some example embodiments, the neural processing units 140-1 to 140-n may operate in a pipelined fashion.

Figure 6:
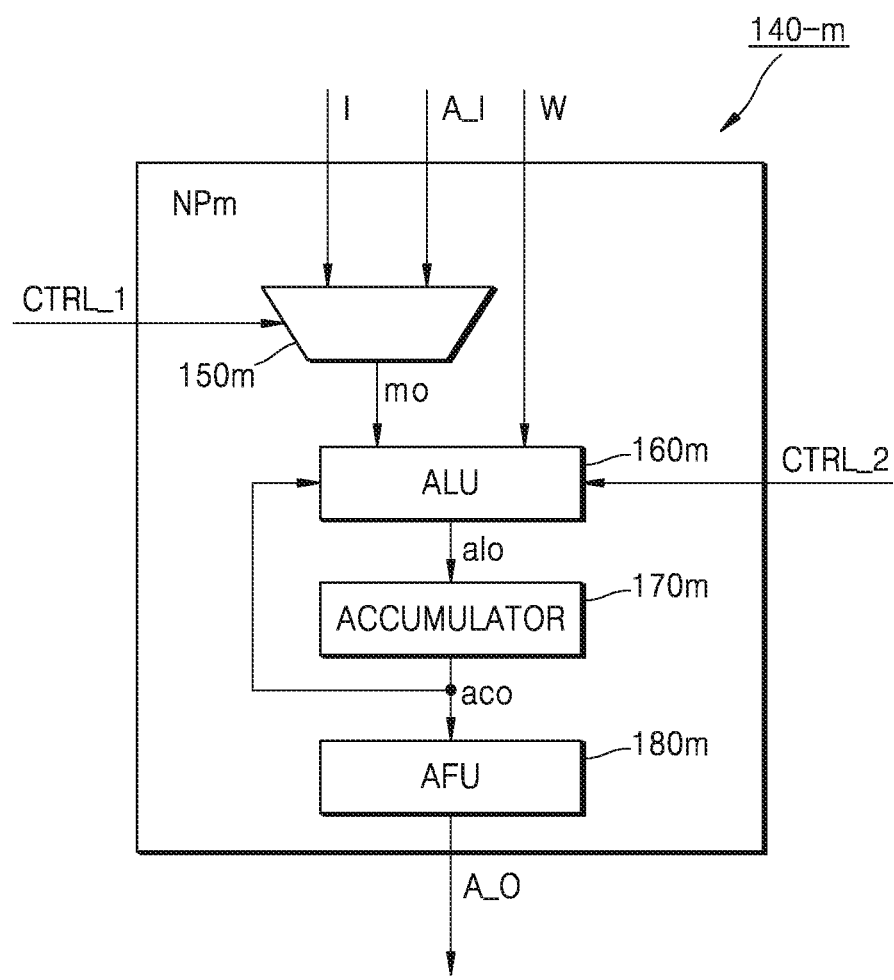
FIG. 6 is a block diagram illustrating a detailed structure of a neural processing unit according to some example embodiments of the present disclosure.

FIG. 6 is a block diagram illustrating a detailed structure of a neural processing unit 140-*m* according to some example embodiments of the present disclosure. For example, the neural processing unit 140-*m* illustrated in FIG. 6 may be one of the neural processing units 140-1 to 140-*n* of FIG. 5. Hereinafter, FIG. 6 will be described with reference to FIG. 5. It will be understood that, in some example embodiments, one or more of the elements 150*m*-180*m* of the neural processing unit 140-*m* may be implemented by circuitry of the neural processing unit 140.

Referring to FIG. 6, the neural processing unit 140-*m* may include and/or may be configured to implement the functionality of an arithmetic logic unit (ALU) 160*m*, an accumulator 170*m*, and an activation function unit (AFU) 180*m*. In addition, the neural processing unit 140-*m* may further include a multiplexer 150*m* and/or may be configured to implement the functionality of a multiplexer 150*m*.

The multiplexer 150*m* may receive the input data I and an input activation A_I and may alternatively select one of the input data I and the input activation A_I based on the first control signal CTRL_1 and output the selected one as a first value mo. For example, the first control signal CTRL_1 may be provided by the controller 130. In some example embodiments, the input data I is training data output from a data RAM (e.g., data RAM 110) of the NPU 100.

For example, the input data I may be provided from the data RAM 110. In addition, the input activation A_I may be provided from one of the neural processing units 140-1 to 140-*n*. For example, based on a layer including neurons corresponding to the neural processing unit 140-*m*, the input activation A_I may be provided from a neural processing unit corresponding to neurons included in the previous layer or may be provided from a neural processing unit corresponding to neurons included in the same layer.

The ALU 160*m* may receive a plurality of pieces of data and may perform arithmetic and logic operations accordingly. For example, the ALU 160*m* may receive the first value mo and the weight W, and may perform a multiplication operation on the first value mo and the weight W. In addition, the ALU 160*m* may further receive an accumulation value aco output from the accumulator 170*m* and may generate an output value alo by performing an addition operation on a result of the multiplication operation on the first value mo and the weight W and the accumulation value aco. The ALU 160*m* may include a fixed-point-type device.

In some example embodiments, in a training mode of the NPU 100 (e.g., in response to the NPU 100 operating in a training mode), the ALU 160*m* may perform an approximate multiplication operation on the first value mo and the weight W. The approximate multiplication operation, which is a kind of approximate computing, may refer to a multiplication operation in which an error of a calculated result value is partially allowed. In addition, in an inference mode of the NPU 100, the ALU 160*m* may perform a general multiplication operation on the first value mo and the weight W.

The accumulator 170*m* may temporarily store a computation result of the ALU 160*m*. In detail, the accumulator 170*m* may include a register that receives and temporarily stores the output value alo of the ALU 160*m*. For example, the accumulator 170*m* may include a configuration in which a plurality of flipflops are connected to each other. The accumulator 170*m* may output the temporarily stored output value alo to the ALU 160*m* or the AFU 180*m* as the accumulation value aco. The accumulator 170*m* may be understood to accumulate one or more output values alo of the approximate multiplication operation performed by the ALU 160*m*.

The AFU 180*m* may receive the accumulation value aco (e.g., an output value of the accumulating performed by the accumulator 170*m*) from the accumulator 170*m*. In some example embodiments, the AFU 180*m* may perform a rounding operation on the accumulation value aco and may generate a post activation A_O regarding the accumulation value aco. It will also be understood that the post activation A_O may be regarding the output of the approximate multiplication operation of the ALU 160*m*. As an example, the AFU 180*m* may perform a rounding operation on the accumulation value aco and may apply an activation function thereto. Alternatively, the AFU 180*m* may apply an activation function to the accumulation value aco and may perform a rounding operation thereon. Alternatively, the AFU 180*m* may perform a rounding operation on the accumulation value aco and may bypass application of an activation function. For example, the AFU 180*m* may perform a stochastic rounding operation on the accumulation value aco. Accordingly, the AFU 180*m* may generate the post activation A_O (or output activation).

Figure 7:
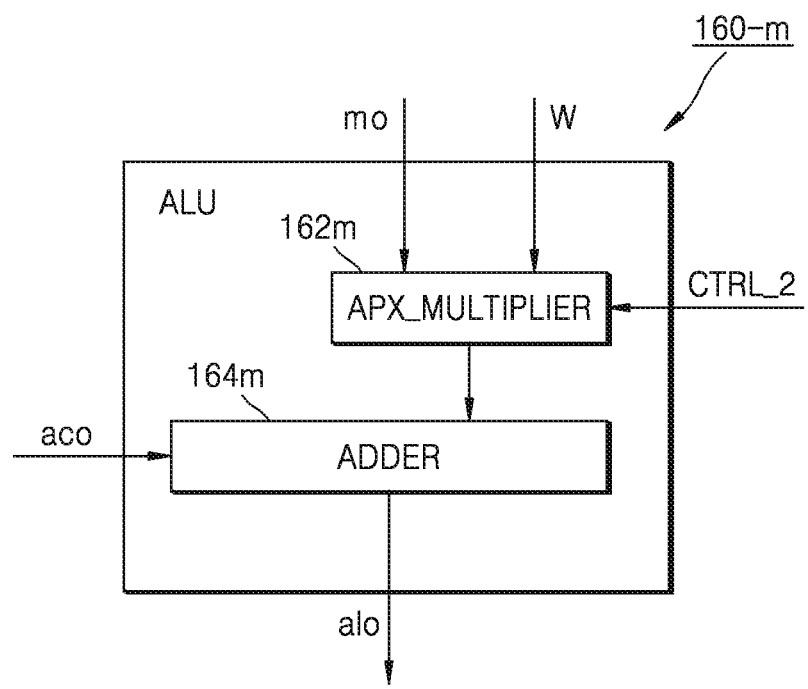
FIG. 7 is a block diagram illustrating an arithmetic logic unit according to some example embodiments of the present disclosure.

FIG. 7 is a block diagram illustrating the ALU 160*m* according to some example embodiments of the present disclosure. For example, FIG. 7 may be a detailed block diagram of the ALU 160*m* illustrated in FIG. 6. Hereinafter, FIG. 7 will be described with reference to FIGS. 5 and 6.

Referring to FIG. 7, the ALU 160*m* may include an approximate multiplier 162*m* and an adder 164*m*. The approximate multiplier 162*m* may perform an approximate multiplication operation on a plurality of input values. In detail, the approximate multiplier 162*m* may receive the first value mo and the weight W and may draw approximate multiplication of the first value mo and the weight W. The approximate multiplier 162*m* may be implemented as various types. e.g., an approximate 4:2 compressor-based multiplier, an approximate modified booth multiplier, etc.

The approximate multiplication of the first value mo and the weight W drawn by the approximate multiplier 162*m* may randomly have an error in one or more bits compared to general multiplication of the first value mo and the weight W. That is, multiplication of the first value mo and the weight W may come to have randomness through approximate multiplication, and a stochastic rounding operation may be subsequently performed in the AFU 180*m* accordingly.

In some example embodiments, the approximate multiplier 162*m* may be controlled to perform approximate multiplication in a training mode of the NPU 100 and perform general multiplication in an inference mode of the NPU 100. For example, the approximate multiplier 162*m* may be controlled to perform one of approximate multiplication and general multiplication (e.g., may operate in one mode of a first mode in which the approximate multiplication operation is performed and a second mode in which a general multiplication operation is performed) based on the second control signal CTRL_2 received from the controller 130.

The adder 164*m* may perform an addition operation on an output of the approximate multiplier 162*m* and the accumulation value aco output from the accumulator 170*m* (e.g., an output value of the accumulating). That is, the adder 164*m* may generate the output value alo by performing an addition operation on a result of a multiplication operation on the first value mo and the weight W and the accumulation value aco in the training mode. The output value alo may be, for example, a value corresponding to a sum of activations received from the previous layer.

Figure 8:
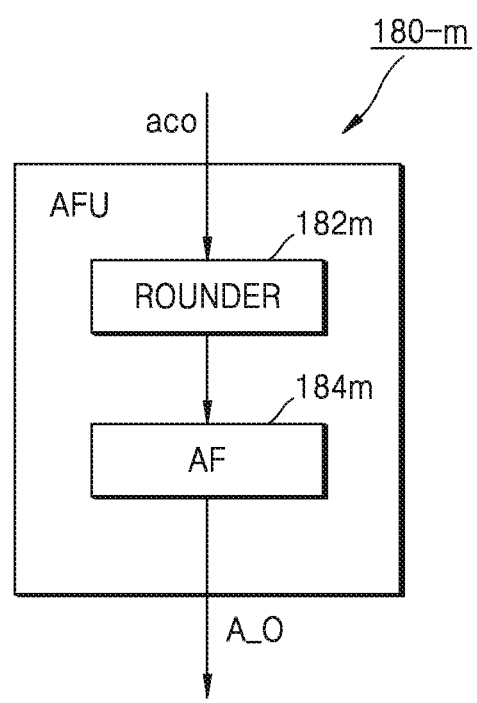
FIG. 8 is a block diagram illustrating an activation function unit according to some example embodiments of the present disclosure.

FIG. 8 is a block diagram illustrating the AFU 180*m* according to some example embodiments of the present disclosure. For example, FIG. 8 may be a detailed block diagram of the AFU 180*m* illustrated in FIG. 6. Hereinafter, FIG. 8 will be described with reference to FIGS. 5 and 6.

Referring to FIG. 8, the AFU 180*m* may include a rounder 182*m* and an activation function (AF) module 184*m*. The rounder 182*m* may perform a rounding operation on the accumulation value aco output from the accumulator 170*m*. In some example embodiments, in a training mode of the NPU 100, the accumulation value aco may randomly have an error based on an approximate multiplication operation, and the rounder 182*m* may perform a stochastic rounding operation on the accumulation value aco accordingly. Through a rounding operation on the accumulation value aco, the accumulation value aco may be quantized.

The stochastic rounding operation may refer to an operation of performing rounding based on probability. For example, on a fixed-point basis where an exponent part is IL and a fractional part is FL, the stochastic rounding operation may be defined as [Equation 2] below.

$$\text{round}(x, \langle IL, FL \rangle) = \begin{cases} \lfloor x \rfloor & \left(\text{with probability } 1 - \frac{x - \lfloor x \rfloor}{\epsilon}\right) \\ \lfloor x \rfloor + \epsilon & \left(\text{with probability } \frac{x - \lfloor x \rfloor}{\epsilon}\right) \end{cases}, \text{(when } \epsilon = 2^{-FL}\text{)} \quad \text{[Equation 2]}$$

In [Equation 2], $\lfloor x \rfloor$ may refer to the largest integer multiple of E from among values smaller than x. In the stochastic rounding operation according to [Equation 2], a rounding operation is performed based on probability, and thus, for example, a small change within the range of $$\left(-\frac{\epsilon}{2}, \frac{\epsilon}{2}\right)$$

may be reflected during training.

The NPU 100 according to the inventive concepts may include a plurality of neural processing units that implement stochastic rounding via the approximate multiplier 162*m* and the rounder 182*m*. The stochastic rounding implemented in the neural processing unit according to some example embodiments may be defined as [Equation 3] below.

$$\text{round}(y, \langle IL, FL \rangle) = \begin{cases} \lfloor y \rfloor & \left(\text{if } \lfloor y \rfloor \leq x \leq \lfloor y \rfloor + \frac{\epsilon}{2}\right) \\ \lfloor y \rfloor + \epsilon & \left(\text{if } \lfloor y \rfloor + \frac{\epsilon}{2} \leq x \leq \lfloor y \rfloor + \epsilon\right) \end{cases}, \quad \text{[Equation 3]}$$

$$\left(\text{when } \epsilon = 2^{-FL} \text{ and } y = x + \text{uniform}\left(-\frac{\epsilon}{2}, \frac{\epsilon}{2}\right)\right)$$

In [Equation 3], a uniform function may be defined as a function of returning a random decimal between two input variables $$\left(-\frac{\epsilon}{2}, \frac{\epsilon}{2}\right).$$

In some example embodiments, the AF module 184*m* may apply an activation function to the rounded accumulation value aco. The AF module 184*m* may apply an activation function to the rounded accumulation value aco and output the post activation A_O. That is, the AF module 184*m* may apply an activation function to a sum of activations received from the previous layer and output the post activation A_O. The AF module 184*m* may apply, for example, a step function, a sigmoid function, a hyperbolic-tangent function, or a Rectified Linear Unit (ReLU), but the present disclosure is not limited thereto.

Although it has been described in some example embodiments that the accumulation value aco rounded in the rounder 182*m* is input to the AF module 184*m*, this is merely an example, and the present disclosure is not limited thereto. As an example, the accumulation value aco may be input to the AF module 184*m* to apply an activation function thereto, and the accumulation value aco having the activation function applied may be input to the rounder 182*m* to perform a stochastic rounding operation thereon. As another example, a stochastic rounding operation may be performed on the accumulation value aco by the rounder 182*m*, and the accumulation value aco may bypass the AF module 184*m* and be output by the AFU 180*m*.

Figure 9:
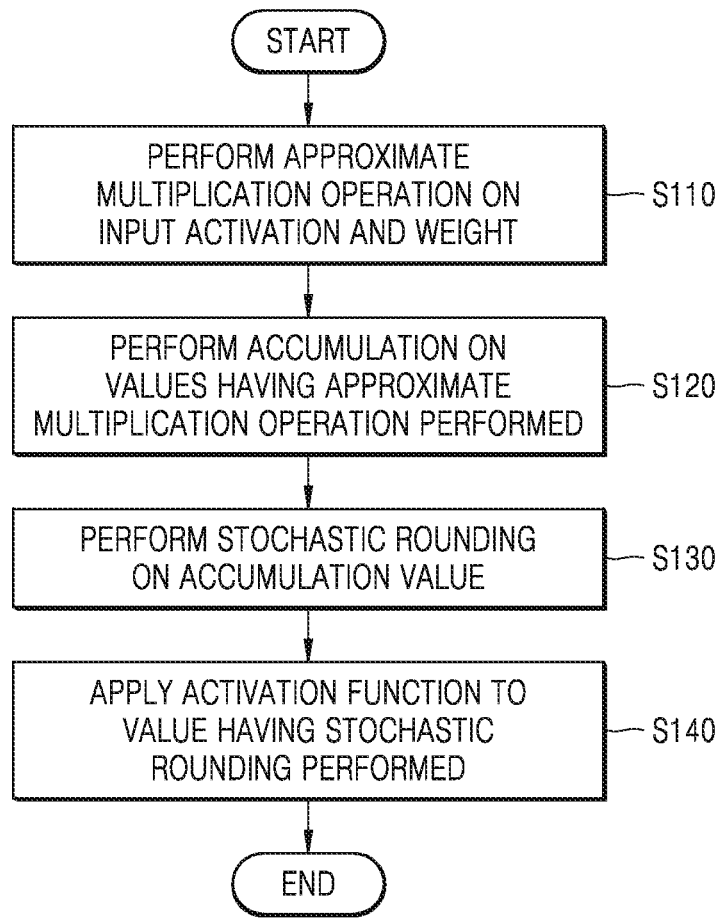
FIGS. 9 and 10 are a flowchart illustrating training of a neural network processing unit according to some example embodiments of the present disclosure and a diagram illustrating stochastic rounding according to some example embodiments of the present disclosure, respectively.
Figure 10:
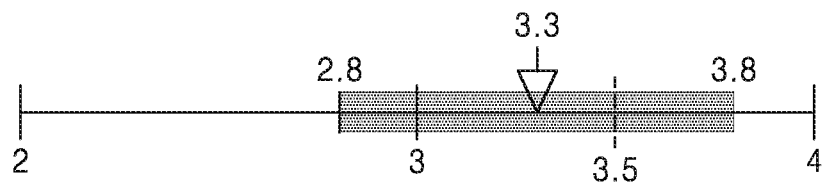

FIGS. 9 and 10 are a flowchart illustrating training of an NPU according to some example embodiments of the present disclosure and a diagram illustrating stochastic rounding according to some example embodiments of the present disclosure, respectively. Hereinafter, FIGS. 9 and 10 will be described with reference to FIGS. 6 to 8.

Referring to FIG. 9, in a training mode of the NPU 100, each neural processing unit may perform an approximate multiplication operation on the input activation A_I and the weight W (operation S110). For example, the approximate multiplication operation may be performed via the approximate multiplier 162*m* included in the ALU 160*m*.

Next, accumulation may be performed on values having the approximate multiplication operation performed (operation S120). The accumulation may be performed on the values having the approximate multiplication operation performed, for example, via the adder 164*m* included in the ALU 160*m* and the accumulator 170*m*. The accumulated values may correspond to, for example, a sum of activations received from the previous layer.

Next, each neural processing unit may perform stochastic rounding on the accumulation value aco (operation S130). For example, the stochastic rounding operation may be performed via the rounder 182*m* included in the AFU 180*m*. After stochastic rounding is performed, an activation function may be applied to the value having stochastic rounding performed (operation S140). Application of the activation function may be performed, for example, via the AF module 184*m* included in the AFU 180*m*.

Further referring to FIG. 10, implementation of stochastic rounding on a random number is illustrated. For example, when the accumulation value aco input to the rounder 182*m* is 3.3, according to stochastic rounding according to some example embodiments of the present disclosure, a probability of being rounded to 3 and a probability of being rounded to 4 may be 70% and 30%, respectively. That is, since a small change may be reflected according to probability even in a fixed-point operation, the NPU 100 according to the inventive concepts may perform fixed-point training. In addition, as a stochastic rounding operation may be performed via an approximate multiplier even without a separate random number generator, an area and power consumption of the NPU 100 may decrease.

Figure 11:
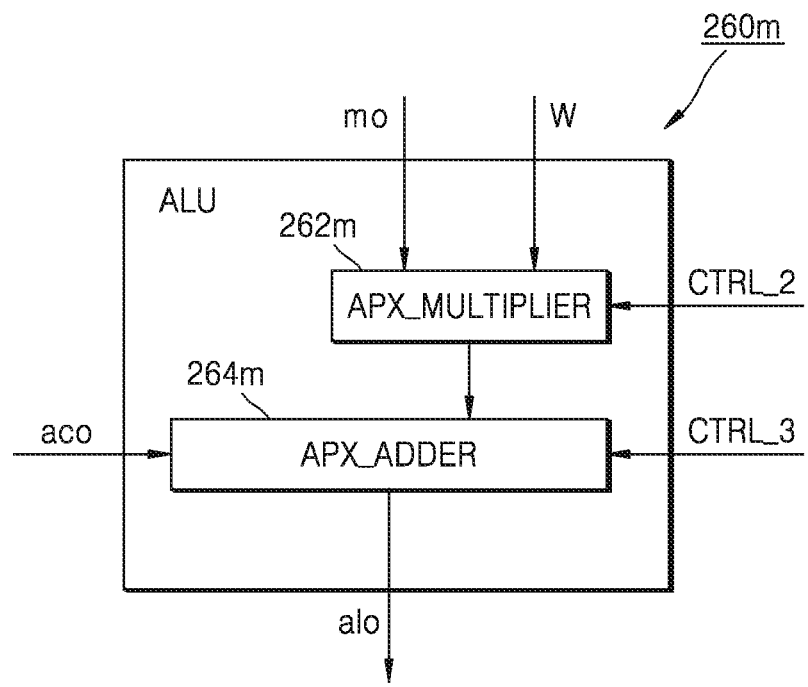
FIG. 11 is a block diagram illustrating an arithmetic logic unit according to some example embodiments of the present disclosure.

FIG. 11 is a block diagram illustrating an ALU 260*m* according to some example embodiments of the present disclosure. A repeated description of configurations illustrated in FIG. 11, which is given with reference to FIG. 7, will be omitted below.

Referring to FIG. 11, the ALU 260m may include an approximate multiplier 262m and an approximate adder 264m. In some example embodiments, the approximate adder 264m may perform an approximate addition operation on an output of the approximate multiplier 262m and the accumulation value aco. The approximate addition operation, which is a kind of approximate computing, may refer to an addition operation in which an error of a calculated result value is partially allowed.

In some example embodiments, the approximate adder 264m may be controlled to perform approximate addition in a training mode of the NPU (100 of FIG. 5) and perform general addition in an inference mode of the NPU (100 of FIG. 5). For example, the approximate adder 264m may be controlled to perform one of approximate addition and general addition based on a third control signal CTRL_3 received from the controller (130 of FIG. 5). For example, in the training mode of the NPU (100 of FIG. 5), the output value alo may come to have randomness through approximate multiplication of the approximate multiplier 262m and approximate addition of the approximate adder 264m, and a stochastic rounding operation may be subsequently performed in the AFU (180m of FIG. 6) accordingly.

Figure 12:
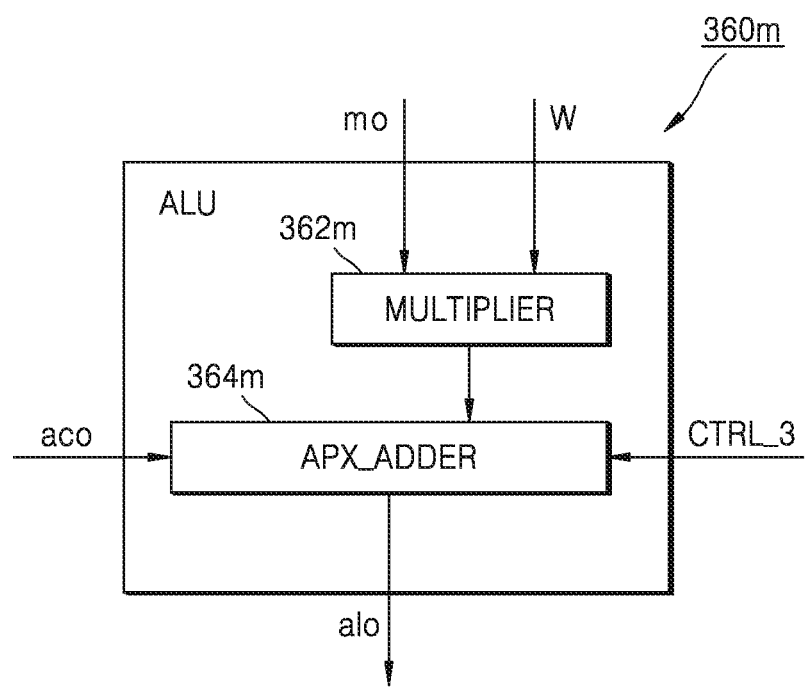
FIG. 12 is a block diagram illustrating an arithmetic logic unit according to some example embodiments of the present disclosure.

FIG. 12 is a block diagram illustrating an ALU 360m according to some example embodiments of the present disclosure. A repeated description of configurations illustrated in FIG. 12, which is given with reference to FIGS. 7 and 11, will be omitted below.

Referring to FIG. 12, the ALU 360m may include a general multiplier 362m and an approximate adder 364m. In some example embodiments, the general multiplier 362m may perform general multiplication in a training mode and an inference mode of the NPU (100 of FIG. 5). In addition, the approximate adder 364m may be controlled to perform approximate addition in the training mode of the NPU (100 of FIG. 5) and perform general addition in the inference mode of the NPU (100 of FIG. 5). For example, in the training mode of the NPU (100 of FIG. 5), the output value alo may come to have randomness through approximate addition of the approximate adder 364m, and a stochastic rounding operation may be subsequently performed in the AFU (180m of FIG. 6) accordingly.

Figure 13:
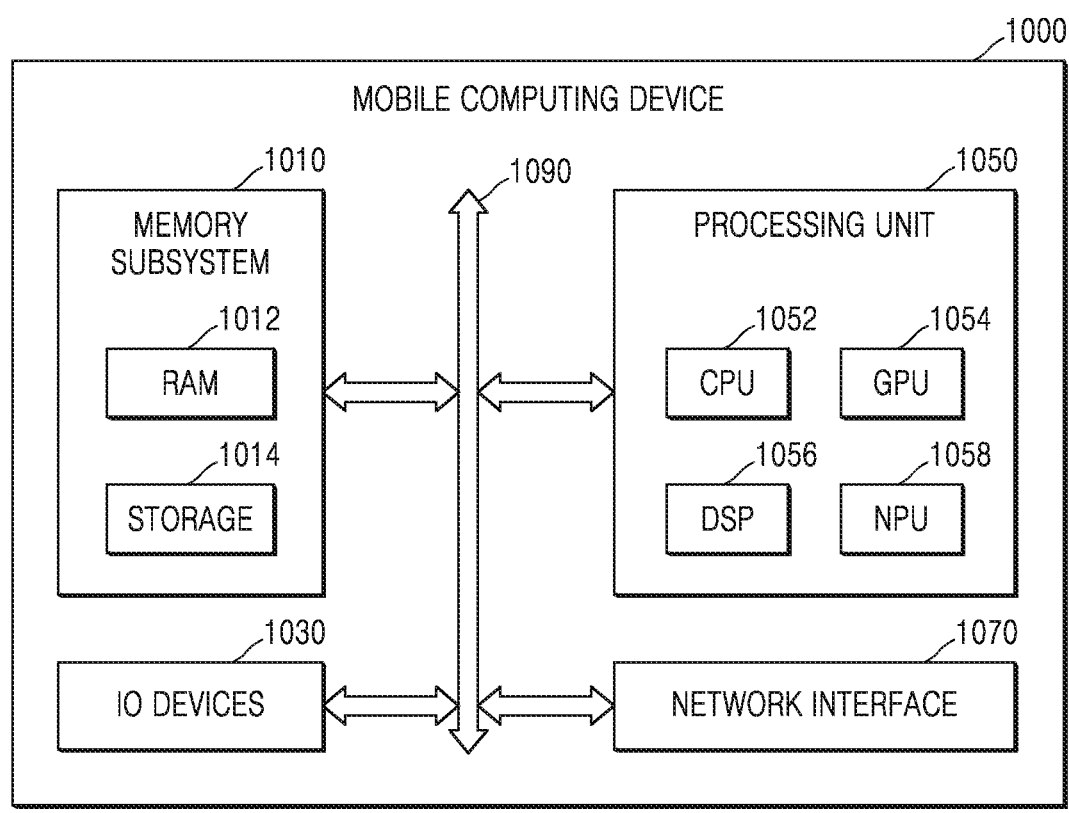
FIG. 13 is a block diagram illustrating a mobile computing device according to some example embodiments of the present disclosure.

FIG. 13 is a block diagram illustrating a mobile computing device 1000 according to some example embodiments of the present disclosure. As non-limiting examples, the mobile computing device 1000 may be any mobile electronic device, such as a mobile phone, a tablet personal computer (PC), a wearable device, or an Internet of Things (IoT) device, to which power is supplied through a battery or self power generation.

As illustrated in FIG. 13, the mobile computing device 1000 may include a memory subsystem 1010, input/output (I/O) devices 1030, a processing unit 1050, and a network interface 1070, and the memory subsystem 1010, the I/O devices 1030, the processing unit 1050, and the network interface 1070 may communicate with one another via a bus 1090. In some embodiments, at least two of the memory subsystem 1010, the I/O devices 1030, the processing unit 1050, and the network interface 1070 may be included in one package as a system on chip.

The memory subsystem 1010 may include RAM 1012 and a storage 1014. The RAM 1012 and/or the storage 1014 may store instructions to be executed by the processing unit 1050 and data to be processed. For example, the RAM 1012 and/or the storage 1014 may store variables such as signals, weights, and biases of a neural network or may store parameters of a neuron (or a node) of the neural network. In some embodiments, the storage 1014 may include non-volatile memory.

The processing unit 1050 may include a central processing unit (CPU) 1052, a graphics processing unit (GPU) 1054, a digital signal processor (DSP) 1056, and an NPU 1058. Unlike that illustrated in FIG. 13, in some embodiments, the processing unit 1050 may include at least some of the CPU 1052, the GPU 1054, the DSP 1056, and the NPU 1058.

The CPU 1052 may control or perform an overall operation of the mobile computing device 1000, and for example, may directly perform a certain operation in response to an external input received via the I/O devices 1030 or may instruct other components of the processing unit 1050 to perform. The GPU 1054 may generate data for an image which is output via a display device included in the I/O devices 1030 or may encode data which is received from a camera included in the I/O devices 1030. The DSP 1056 may generate useful data by processing a digital signal, for example, a digital signal provided from the network interface 1070.

The NPU 1058, which is exclusive hardware for the neural network, may include neural processing units corresponding to at least some neurons constituting the neural network, and at least some of the neural processing units may process signals in parallel. The NPU 1058 according to some example embodiments of the present disclosure may include an approximate multiplier and a rounder and may perform neural network training accordingly, which enables fixed-point training with high accuracy, thereby improving the operational performance and/or functionality of the mobile computing device 1000. In addition, since stochastic rounding may be performed even without a separate random number generator, an area and power consumption of the NPU 1058 may decrease, thereby further improving the operational performance and/or functionality of the mobile computing device 1000.

The I/O devices 1030 may include input devices such as a touch input device, a sound input device, and a camera, and output devices such as a display device and a sound output device. For example, when a user's voice is input via the sound input device, the voice may be recognized by the neural network implemented in the mobile computing device 1000, and a corresponding operation may be triggered. In addition, when an image is input via the camera, an object included in the image may be recognized by the neural network implemented in the mobile computing device 1000, and an output such as virtual reality may be provided to the user. The network interface 1070 may provide an access to a mobile communication network such as Long Term Evolution (LTE), 5G, etc. to the mobile computing device 1000 or may provide an access to a local network such as Wi-Fi.

Figure 14:
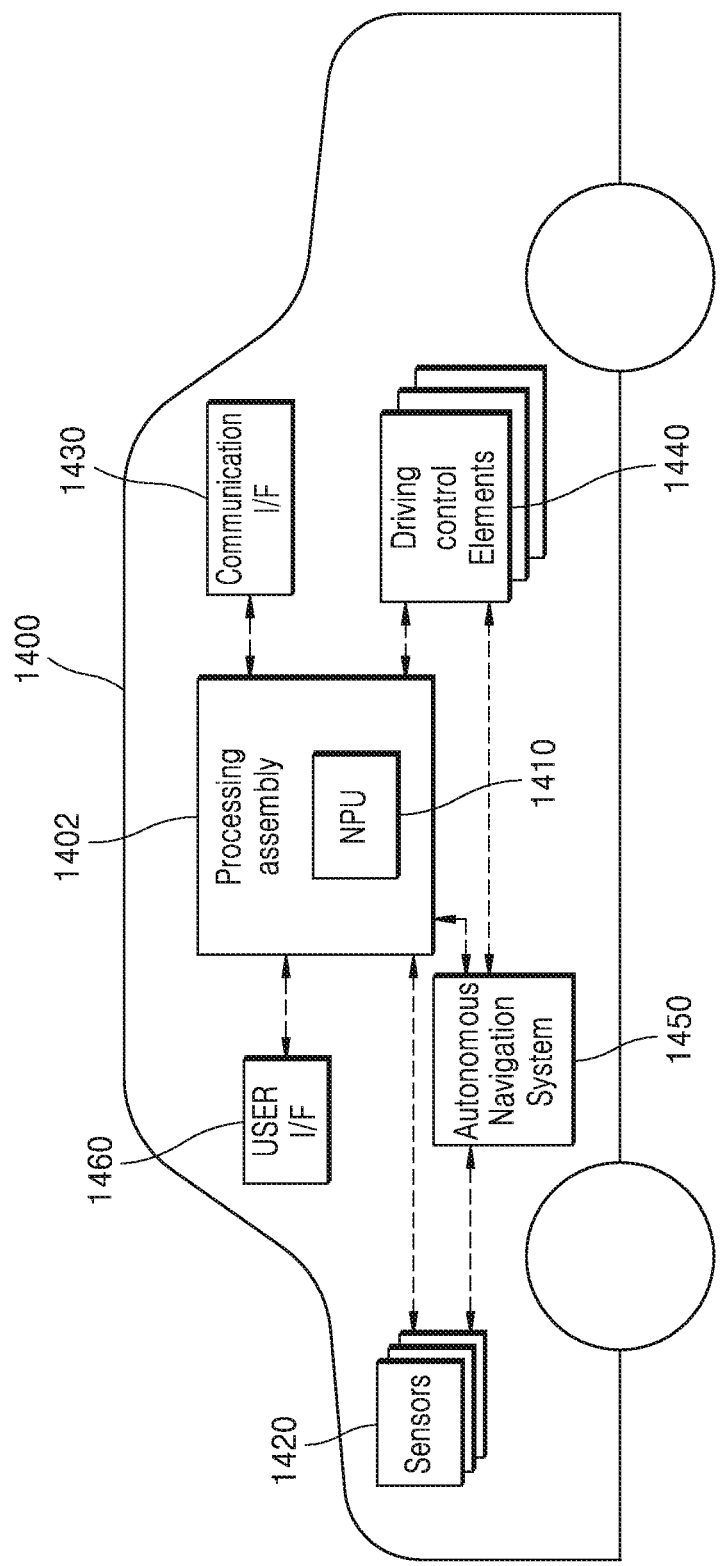
FIG. 14 illustrates a vehicle according to some example embodiments.

FIG. 14 illustrates a vehicle according to some example embodiments.

Referring to FIG. 14, the vehicle 1400 may include one or more of a processing assembly 1402, one or more sensor devices 1420, one or more communication interfaces 1430, one or more driving control elements 1440, an autonomous navigation system 1450, and one or more vehicle occupant ("user") interfaces 1460.

As described herein, the one or more sensors 1420 may include one or more camera devices, active scanning devices (e.g., one or more LiDAR sensor devices), one or more ultrasonic sensor devices, one or more geospatial positioning devices, some combination thereof, or the like. A sensor device 1420 may generate a sensor signal based on monitoring one or more portions of an external environment surrounding the vehicle 1400.

As described herein, the one or more driving control elements may include one or more of a vehicle steering device configured to control steering of the vehicle 1400, a throttle device configured to control at least a portion of a motor of the vehicle 1400 to control acceleration and/or motion of the vehicle 1400, a brake device configured to control braking of the vehicle 1400, a light assembly configured to provide an external illumination (e.g., headlights, braking lights, turn signal indicator lights, or the like), a climate control assembly configured to control heating and/or cooling of one or more portions of the vehicle 1400 cabin, or any other known element configured to control any operation of the vehicle 1400.

As described herein, the user interface 1460 may include one or more of a graphical display interface (GUI) presented on one or more display screens in the vehicle 1400 cabin (including a touchscreen display, non-interactive display, heads-up display, some combination, or the like), audio interface (e.g., speakers and/or microphones), tactile interface devices, some combination thereof, or the like.

As described herein, the one or more communication interfaces 1430 may include a radio transceiver, wireless network communication transceiver, ad hoc wireless network communication transceiver, geospatial positioning system (GPS) device, some combination thereof, or the like.

As described herein, the autonomous navigation system 1450 may include a computing device (e.g., at least one memory storing a program of instructions and at least one processor configured to execute the program of instructions) that is configured to implement autonomous control of one or more driving control elements 1440 to autonomously navigate the vehicle 1400 through an environment. The autonomous navigation system 1450 may be configured to implement such autonomous control of one or more driving control elements based on processing sensor data generated by one or more sensor devices 1420.

As shown, the processing assembly 1402 may include a neural network processing unit (NPU) 1410. The NPU 1410 may be the NPU 100 and/or the NPU 1058 as described herein. In some example embodiments, the processing assembly 1402 is included in the autonomous navigation system 1450, such that the autonomous navigation system includes the NPU 1410.

In some example embodiments, the vehicle 1400 is configured to engage in autonomous navigation ("autonomous driving"), e.g., driving of the vehicle independently of vehicle occupant control of any driving control elements 1440, such that the vehicle 1400 may be referred to herein as an autonomous vehicle.

In some example embodiments, the NPU 1410, which may be the NPU 100 and/or NPU 1058 as described herein, may be configured to receive one or more pieces ("instances") of input data that includes sensor data generated by one or more sensor devices 1420. The NPU 1410 may be configured to receive a plurality of weights from one or more various devices, including one or more IPs that may be included in the processing assembly 1402 and/or the autonomous navigation system 1450. The weights may be received at the NPU via one or more of a user interface 1460, a sensor device 1420, or a communication interface 1430.

The NPU 1410 may be configured to perform the functionality of the NPU 100 as described herein, e.g., performing a computation based on one or more instances of input data (e.g., sensor data) and a plurality of weights to generate an output signal (e.g., a post activation A_O) that may be a driving control element control signal that is transmitted to at least one driving control element 1440 to cause the at least one driving control element 1440 to implement control over one or more aspects of driving of the vehicle 1400 to autonomously navigate the vehicle 1400.

Furthermore, in some example embodiments, the one or more instances of input data may be data received at the NPU 1410 from one or more of a user interface 1460 and a communication interface 1430. Additionally, in some example embodiments, the NPU 1410 is configured to generate an output signal (e.g., a post activation A_O) that causes a user interface 1460 to provide a user interface functionality with regard to one or more particular occupants of the vehicle 1400. Also, in some example embodiments, the NPU 1410 is configured to generate an output signal (e.g., a post activation A 0) that causes a communication interface 1430 to communicate information and/or a request for information to one or more external, remotely-located entities, including a base station, another vehicle, a remotely-located communication device (e.g., a smartphone), a server device in a wireless network, some combination thereof, or the like.

In some example embodiments, the NPU 1410 may include an approximate multiplier and a rounder and may perform neural network training accordingly, which enables fixed-point training with high accuracy, thereby improving the operational performance and/or functionality of the vehicle 1400 with regards to being configured to implement autonomous navigation of the vehicle 1400. For example, the NPU 1410 may be configured to enable autonomous navigation of the vehicle 1400, based on processing sensor data generated by one or more sensor devices 1420, with improved accuracy, precision, and/or efficiency, thereby improving the autonomous navigation functionality of the vehicle 1400. In addition, since stochastic rounding may be performed even without a separate random number generator, an area and power consumption of the NPU 1410 may decrease, thereby further improving the operational performance and/or functionality of the vehicle 1400 with regard to at least efficient and compact hardware associated with autonomous navigation functionality of the vehicle 1400.

While the inventive concepts have been particularly shown and described with reference to example embodiments thereof, it will be understood that various changes in form and details may be made therein without departing from the spirit and scope of the following claims.

What is claimed is:

1. A neural network processing unit configured to perform a computation based on one or more instances of input data and a plurality of weights, the neural network processing unit comprising:
   processing circuitry configured to output at least a first control signal and a second control signal to at least one neural processor (NPU), the first and second control signals respectively configured to enable a selection by the at least one NPU between a training mode and an inference mode; and
   a plurality of neural processors (NPUs) configured to implement a neural network, and including the at least one NPU,
   wherein the at least one NPU of the plurality of NPUs is configured to switch to a fixed-point approximate multiplication training mode in response to receiving the first control signal, receive a first value and a second value while in the fixed-point approximate multiplication training mode, perform a fixed-point approximate multiplication operation based on the first value and the second value in response to receiving the first value and the second value while in the fixed-point approximate multiplication training mode, review an output value for a loss of accuracy, the output value including a result of the fixed-point approximate multiplication operation and the review including performing a stochastic rounding operation on the output value, and determining, based on a result of the stochastic rounding operation, the loss of accuracy for the output value, and train the neural network by tuning a parameter of the at least one NPU based on the determined loss, and wherein the at least one NPU of the plurality of NPUs is configured to select a general multiplication inference mode in response to receiving the second control signal, receive an input value while in the general multiplication inference mode, and perform a general multiplication operation based on the input value and the tuned parameter in response to receiving the input value while in the general multiplication inference mode.

2. The neural network processing unit of claim 1, wherein the at least one NPU is further configured to alternatively select one element of the one or more instances of input data and an output value of one NPU of the plurality of NPUs, and output the selected one element as the first value.

3. The neural network processing unit of claim 1, wherein the second value includes at least one weight of the plurality of weights.

4. The neural network processing unit of claim 1, wherein the at least one NPU is further configured to accumulate one or more output values of the fixed-point approximate multiplication operation; and perform an addition operation based on the output value of the approximate multiplication operation and an output value of the accumulating.

5. The neural network processing unit of claim 4, wherein the at least one NPU is configured to perform the stochastic rounding operation on the output value of the accumulating.

6. The neural network processing unit of claim 1, wherein the at least one NPU includes a fixed-point-type device.

7. A system on chip, comprising:

one or more semiconductor intellectual property cores (IPs);

processing circuitry configured to output at least a first control signal and a second control signal to at least one neural processor (NPU), the first and second control signals respectively configured to enable a selection by the at least one NPU between a training mode and an inference mode; and a neural network processing unit configured implement a neural network and to receive input data from the one or more IPs, and perform a neural network computation based on the input data and a plurality of weights, the neural network processing unit including a plurality of neural processors (NPUs) and the plurality of NPUs include the at least one NPU, wherein the at least one NPU of the plurality of NPUs is configured to switch to a fixed-point approximate multiplication training mode in response to receiving the first control signal, receive a first value and a second value while in the fixed-point approximate multiplication training mode, perform a fixed-point approximate multiplication operation on the first value and the second value in response to receiving the first value and the second value while in the fixed-point approximate multiplication training mode, review an output value for a loss of accuracy, the output value including a result of the approximate multiplication operation and the review including perform a stochastic rounding operation on the output value to output a post activation regarding the output of the approximate multiplication operation, and determine, based on the result of the stochastic rounding operation, the loss of accuracy for the output value, and train the neural network by tuning a parameter of the at least one NPU based on the determined loss, and wherein the at least one NPU of the plurality of NPUs is configured to select a general multiplication inference mode in response to receiving the second control signal, receive an input value while in the general multiplication inference mode, and perform a general multiplication operation based on the input value and the tuned parameter in response to receiving the input value while in the general multiplication inference mode.

8. The system on chip of claim 7, wherein the neural network processing unit further includes data random access memory (data RAM) configured to receive training data from the one or more IPs in the fixed-point approximate multiplication training mode and store the training data.

9. The system on chip of claim 8, wherein the at least one NPU is configured to receive training data output from the data RAM and an output value of one of the plurality of NPUs, select one of the training data and the output value, and output the selected one of the training data and the output value as the first value.

10. The system on chip of claim 7, wherein the second value includes at least one weight of the plurality of weights.

11. The system on chip of claim 7, wherein the at least one NPU is configured to accumulate one or more output values of the fixed-point approximate multiplication operation, perform an addition operation based on the output value of the fixed-point approximate multiplication operation and an output value of the accumulating, and perform the stochastic rounding operation on the output value of the accumulating.

12. A neural network processing unit configured to perform a training operation based on one or more instances of training data and a plurality of weights in a training mode or to perform an inference operation based on one or more instances of input data and the plurality of weights in an inference mode, the neural network processing unit comprising:

a controller configured to output at a first control signal and a second control signal to at least one neural processor (NPU), the first and second control signals respectively configured to enable a selection by the at least one NPU between the training mode and the inference mode; and a plurality of neural processors (NPUs) including the at least one NPU, wherein the at least one NPU of the plurality of NPUs is configured to, switch to a fixed-point approximate multiplication training mode in response to receiving the first control signal, receive a first value and a second value while in the fixed-point approximate multiplication training mode, perform a fixed-point approximate multiplication operation on the first value and the second value in the training mode in response to receiving the first value and the second value while in the fixed-point approximate multiplication training mode, perform an addition operation on an output value of the fixed-point approximate multiplication operation and a third value, accumulate an output value of the fixed-point approximate multiplication operation, review an output value for a loss of accuracy, the output value including an accumulation value output based on the accumulating and the review including performing a stochastic rounding operation on an accumulation value output based on the accumulating to output a post activation regarding the accumulation value, determining, based on a result of the stochastic rounding operation, the loss of accuracy for the output value, and train the neural network by tuning a parameter of the at least one NPU based on the determined loss, and wherein the at least one NPU of the plurality of NPUs is configured to select a general multiplication inference mode in response to receiving the second control signal, to receive an input value while in the general multiplication inference mode, and perform a general multiplication operation based on the input value and the tuned parameter in response to receiving the input value while in the general multiplication inference mode.

13. The neural network processing unit of claim 12, wherein the first value includes one of the one or more instances of training data and an output value of one of the plurality of NPUs, and the second value includes at least one weight of the plurality of weights.

14. The neural network processing unit of claim 12, wherein the third value includes the accumulation value output based on the accumulating.

15. The neural network processing unit of claim 12, wherein the training operation includes a fixed-point-type training operation including the fixed-point approximate multiplication operation and an approximate addition operation.

16. The neural network processing unit of claim 1, wherein the at least one NPU includes an approximate multiplier configured to perform the fixed-point approximate multiplication operation and to be enabled by the first control signal, and an approximate adder configured to perform an approximate addition operation on an output of the approximate multiplier.

17. The system on chip of claim 7, wherein the at least one NPU includes an approximate multiplier configured to perform the fixed-point approximate multiplication operation and to be enabled by the first control signal, and an approximate adder configured to perform an approximate addition operation on an output of the approximate multiplier.

\* \* \* \* \*